United States Patent [19]

Mortensen

[11] Patent Number: 4,745,943

[45] Date of Patent: May 24, 1988

[54] CONTINUOUS FLOW STEAM CONDENSATE REMOVAL DEVICE

[76] Inventor: Erik M. Mortensen, 14 Greentree Dr., West Chester, Pa. 19380

[21] Appl. No.: 43,601

[22] Filed: Apr. 28, 1987

[51] Int. Cl.$^4$ .......................... B01D 46/10; F15D 1/02
[52] U.S. Cl. ...................................... 137/177; 138/44; 55/466
[58] Field of Search ................... 138/44; 137/171, 183; 55/185, 189, 190, 199, 277, 466

[56] References Cited

U.S. PATENT DOCUMENTS

| 2,790,463 | 4/1957 | Delano ................................ 138/44 |
| 4,171,209 | 10/1979 | Brown . |
| 4,426,213 | 1/1984 | Stavropoulos ..................... 138/44 X |
| 4,486,208 | 12/1984 | Stavropoulos . |

Primary Examiner—Alan Cohan
Attorney, Agent, or Firm—Fleit, Jacobson, Cohn & Price

[57] ABSTRACT

A continuous flow steam condensate removal device includes a Venturi-type nozzle of relatively small diameter formed in an intermediate portion of a unitary body. With respect to the Venturi-type nozzle, the unitary body includes an upstream annular conically tapered entrance surface, a relatively long condensate collection passageway for forming a condensate steam seal, and a flow-reduction passageway. Downstream, the unitary body includes a condensate discharge-transition passageway and an enlarged-diameter frustoconical discharge passageway for flushing and maintaining a downstream condensate return line clear of debris.

12 Claims, 1 Drawing Sheet

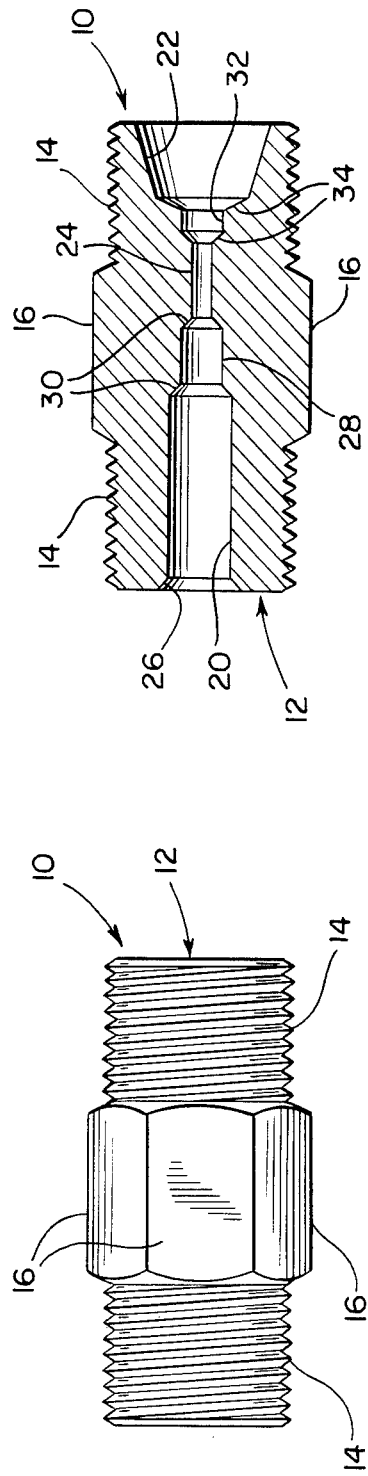
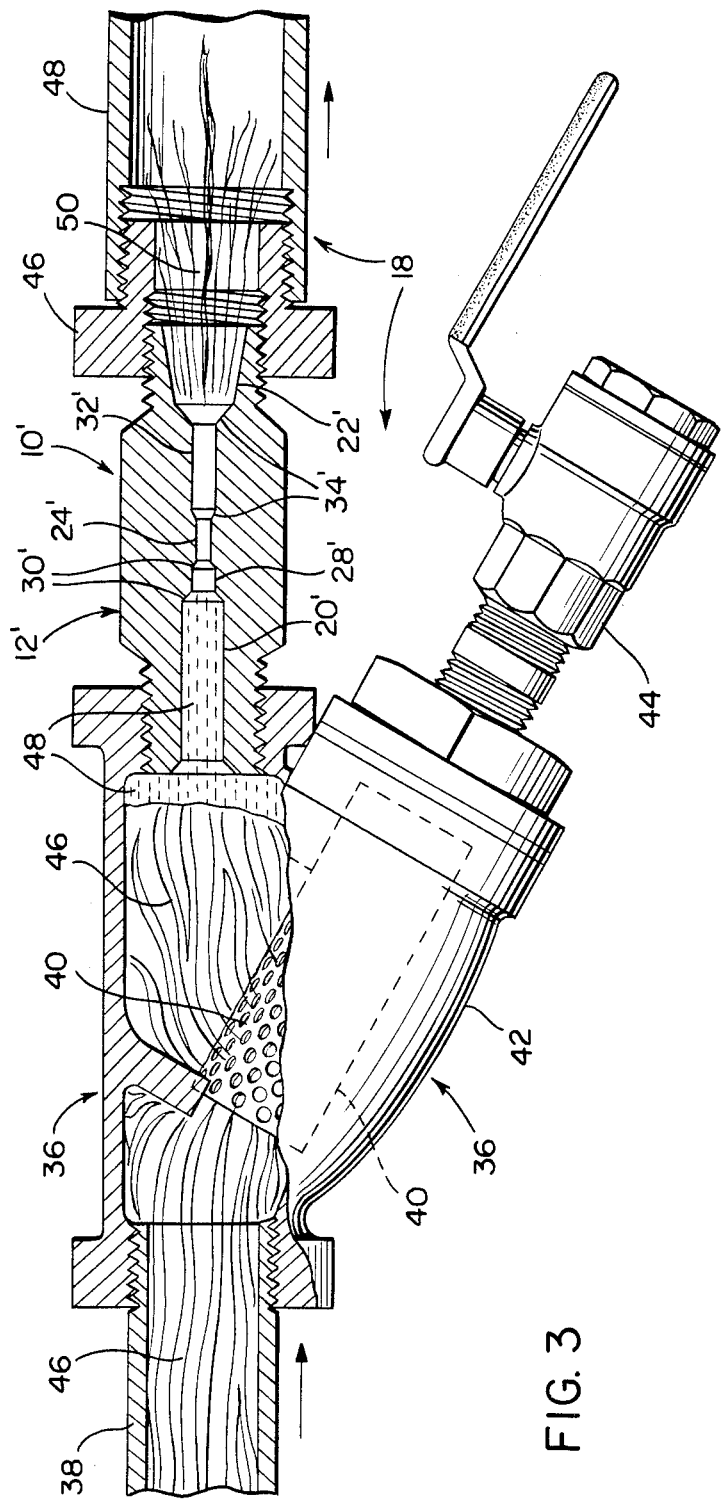

CONTINUOUS FLOW STEAM CONDENSATE REMOVAL DEVICE

BACKGROUND OF THE INVENTION

1. Field of the Invention

This invention relates to a continuous flow steam condensate removal device, and more particularly to a Venturi-type steam condensate removal device of unitary construction which is less expensive and more efficient than prior known devices.

2. Description of the Related Art

The use of devices or "steam traps" for the removal of condensate from steam lines is well known. In the past, mechanical devices which remain closed until a predetermined amount of condensate has collected therein, and periodically open to let the collected condensate pass through to a condensate receiving tank or reservoir, have been used. These devices, however, have a number of disadvantages, including initial high cost and high maintenance, repair and replacement costs. These traps also increase energy costs as a result of steam "blowing through" the relatively large open trap orifice, delays in the trap reclosing, or failure of the trap in an open condition so that the trap does not reclose at all. This "blow through" also is disadvantageous because the high temperature of the steam then tends to produce process temperature variations in associated equipment, causing reduced efficiency, and high temperatures and back pressure in the condensate receiving tank and its associated equipment.

Accordingly, more recently, Venturi-type devices of a continuous flow type have been used. For example, U.S. Pat. No. 4,171,209, issued Oct. 16, 1979, to Timothy S. Brown, discloses various Venturi-type devices (steam traps) for removing condensate from steam lines, wherein the primary feature of each device is the provision of one or more screens in an upstream passageway of the device, to filter out debris which could cause clogging of a Venturi-type orifice extending through an intermediate portion of the device. FIGS. 8 and 9 of that patent disclose a device having a unitary body with external screw threads on both ends, a Venturi-type orifice in the center of the body, and long inlet and outlet passageways. The device has a hexagonal form at its center and internal conical surfaces interconnecting the inlet and outlet passageways and the Venturi-type orifice. The unitary body is disclosed as being preferably formed of Type 304 stainlesssteel. U.S. Pat. Nos. 4,426,213 and 4,486,208, issued Jan. 17 and Dec. 4, 1984, respectively, to Constantine N. Stavropoulos, disclose similar devices having an insertable tubular nozzle structure in a unitary body.

A primary purpose of this invention is to provide a new and improved continuous flow steam condensate removal device which is less expensive, more efficient and more durable than devices of the prior art, including those disclosed in the Brown and Stavropoulos patents.

SUMMARY OF THE INVENTION

In general, this invention relates to a continuous flow steam condensate removal device comprising an elongated tubular unitary body having an entrance end, an intermediate portion and an exit end. A cylindrical Venturi-type nozzle of relatively small diameter is formed in the intermediate portion of the unitary body and extends along the longitudinal axis thereof. An elongated cylindrical upstream condensate collection passageway of larger diameter is formed in the unitary body and extends from adjacent the entrance end of the unitary body and along its longitudinal axis to adjacent the Venturi-type nozzle. Further, a conically-shaped downstream condensation discharge passageway in the unitary body extends along the longitudinal axis thereof and flares continuously outward in a downstream direction from adjacent the Venturi-type nozzle to substantially the exit end of the unitary body.

More specifically, the steam condensate removal device comprises an elongated unitary body formed of a hard, long-wearing material, such as No. 316 stainless steel, and the body has external screw threads formed at opposite ends thereof, with at least two opposite side flat surfaces formed intermediate the external screw threads. An elongated cylindrical upstream condensate collection passageway in the unitary body extends along its longitudinal axis, and an annular conically-shaped surface surrounds an entrance to the condensate collection passageway to facilitate flow into the passageway. The condensate collection passageway merges with a flow-reduction passageway of reduced diameter, which feeds to the Venturi-type nozzle. The Venturi-type nozzle feeds into a condensate discharge-transition passageway, which feeds into a frustoconical downstream condensate discharge passageway. Preferably, the condensate collection passageway is relatively long, to provide a long condensate collection area in front of the Venturi-type nozzle, so as to prevent the escape of steam through the nozzle, and the frustoconical downstream discharge passageway is of relatively large diameter so that condensate sprays from the Venturi-type nozzle with a high velocity, thereby reducing the possibility of debris accumulating downstream from the device.

BRIEF DESCRIPTION OF THE DRAWINGS

FIG. 1 is a side view of a continuous flow steam condensate removal device in accordance with the invention;

FIG. 2 is a cross-sectional view taken along the center line of the device shown in FIG. 1; and FIG. 3 is a partial cross-sectional view, showing another embodiment of a device in the accordance with the invention, mounted in a steam condensate removal system.

DETAILED DESCRIPTION

Referring to FIG. 1, a continuous flow steam condensate removal device 10 in accordance with the invention includes an elongated unitary body 12 having external screw threads 14 formed at its opposite ends. The unitary body 12 also has a hexagonal form, with opposite side flat surfaces 16, formed at its center intermediate the external screw threads 14, to facilitate connecting the device 10 with other screw threaded parts of a steam condensate removal system 18, as shown in FIG. 3.

Referring to FIG. 2, the unitary body 12 is formed with an elongated cylindrical upstream condensate collection passageway 20 extending along the longitudinal axis of the unitary body, and a frustoconical downstream condensate discharge passageway 22 also extending along the longitudinal axis of the unitary body. A cylindrical Venturi-type nozzle or orifice 24 is formed in the unitary body 12 between the upstream condensate collection passageway 20 and the downstream condensate discharge passageway 22, and is of small diameter as compared to the diameters of the passageways.

An annular conically tapered surface 26 surrounds an entrance to the elongated cylindrical upstream condensate collection passageway 20 and extends inwardly in a downstream direction to facilitate flow into the condensate collection passageway. The upstream condensate collection passageway 20 is connected to an entrance end of the Venturi-type nozzle 24 by a flow-reduction passageway 28 of reduced diameter, and conically-shaped interconnecting surfaces 30. Similarly, an exit end of the Venturi-type nozzle 24 is connected with the downstream condensate discharge passageway 22 by a condensate discharge-transition passageway 32 of substantially the same diameter as the upstream condensate collection passageway, and conically-shaped interconnecting surfaces 34.

FIG. 3 shows another embodiment of a continuous flow steam condensate removal device 10' which is similar to the device 10 shown in FIG. 2, except for being smaller in overall size, and with respect to the internal dimensions of certain parts of the device. Otherwise, the device 10' shown in FIG. 3 is identical to the device 10' shown in FIG. 2, and corresponding parts of the device shown in FIG. 3 are identified by the same reference numerals.

With further reference to FIG. 3, the upstream end of the steam condensate removal device 10' is screw-threadably connected into one end of a device known as a Y-strainer 36. The other end of the Y-strainer device 36 is screw-threadably connected to a steam line 38. A cylindrical screen 40 is disposed in a branch leg 42 of the Y-strainer device 36 so that steam and condensate flowing toward the steam condensate removal device 10' must pass through the screen for the removal of debris before the steam and condensate reach the steam condensate removal device. Preferably, the screen 40 is formed of perforated #60 mesh stainless steel, rather than a wire mesh screen, for greater rigidity, longer wear and less susceptibility to clogging. The branch leg 42 of the Y-strainer device 36 is provided with a blow-down valve 44 of a known type, for periodically removing dirt and other debris collected by the screen 40, in a known manner. The downstream end of the steam condensate removal device 10' is screw-threadably connected by a coupling member 46 to a condensate return line 48.

As is shown in FIG. 3, in use of the steam condensate removal device 10', steam 46 attempts to pass through the Venturi-type nozzle 24' at a high velocity (approaching 760 MPH), while condensate 48 in the steam wants to travel through the Venturi-type nozzle at a much lower rate (e.g., 30 MPH). As a result, the condensate 48 tends to collect at the upstream end of the device 10' in the Y-strainer device 36 and in the condensate collection passageway 20'. Accordingly, in accordance with the invention, the condensate collection passageway 20' is of a relatively long length, such as on the order of twice that of the condensate discharge passageway 22', so that the condensate 48 collected therein can better function as a seal to prevent the escape of the steam 46 from the Y-strainer device 36 and the steam line 38, into the condensate return line 48. The reduced-diameter flow-reduction passageway 28' between the condensate collection passageway 20' and the Venturi-type nozzle 24' further enhances this sealing capability of the condensate 48.

As the condensate 48 collects in the condensate collection passageway 20' and in front of the entrance to the condensate collection passageway, as illustrated in FIG. 3, the blocked steam 46 causes a pressure build-up in the collected condensate so that the condensate is periodically forced out of the condensate collection passageway, through the Venturi-type nozzle 24. The condensate 48 then travels through the discharge-transition passageway 22' and exits therefrom through the frustoconical condensate discharge passageway 22' at high pressure in a fine spray 50, into the condensate return line 48, to cause a continuous flushing of debris through the coupling member 46 and the return line, and preventing accumulation of the debris therein.

To facilitate the discharge of the condensate 48 in the fine spray 50 and prevent the collection of debris in the coupling member 46 and the condensate return line 48, the frustoconical condensate discharge passageway 22' has a relatively large initial upstream diameter in comparison to the diameter of the condensate-discharge transition passageway 32'. The frustoconical condensate discharge passageway 22' also flares outward continuously in a downstream direction for the same purpose, at a reduced angle to the longitudinal axis of the unitary one-piece body 12', as compared to an outwardly flaring angle of the adjacent interconnecting surface 34'. Preferably, the initial upstream diameter of the condensate discharge passageway 22' also is larger than that of the condensate collection passageway 20' and at least double the diameter of the condensate discharge-transition passageway 24'.

The elongated unitary bodies 12 and 12' of the steam condensate removal devices 10 and 10' are preferably formed of a hard material, such as No. 316 stainless steel, so that the Venturi-type nozzles 24 and 24' have a long-wearing capability. Forming the bodies 12 and 12' of this material also produces devices 10 and 10' which have a pressure-withstanding capability of on the order of 2500 psig and a temperature-resistance capability of up to 3000° F.

The steam condensate removal devices 10 and 10' are of different sizes, as noted previously, with selected internal dimensions being the same or different, depending on the size of the steam line 38 and the expected degree of condensation therein. For example, the diameter of the Venturi-type nozzle 24 or 24' may vary from on the order of 0.024 inches to 0.554 inches, with other dimensions of the devices 10 and 10' modified accordingly. By way of illustration, the following table illustrates various dimensions of the different parts of the larger condensate removal device 10 shown in FIGS. 1 and 2, and the smaller condensate removal device 10' shown in FIG. 3, respectively.

| PART | FIGS. 1 and 2 (Inches) | FIG. 3 (Inches) |
| --- | --- | --- |
| Nozzle diameter | .156 | .105 |
| Nozzle length | .500 | .500 |
| Condensate collection passageway diameter | .375 | .375 |
| Discharge passageway initial diameter | .625 | .375 |
| Discharge passageway outer diameter | .750 | .5625 |
| Condensate collection passageway length | 1.0 | 1.0 |

| PART | FIGS. 1 and 2 (Inches) | FIG. 3 (Inches) |
| --- | --- | --- |
| Discharge passageway length | .500 | .500 |
| Flow-reduction passageway length | .5625 | .160 |
| Flow-reduction passageway diameter | .218 | .150 |
| Discharge-transition passageway length | .125 | .500 |
| Discharge-transition passageway diameter | .250 | .150 |

In summary, a new and improved steam condensate removal device, such as the devices 10 and 10', have been disclosed. The devices 10 and 10' are inexpensive to manufacture, and more efficient and long-wearing than prior known devices. The long condensate collection passageway 20 or 20' is desirable from the standpoint of preventing the escape of steam from the steam line 38 through the device 10 or 10' into the condensate return line 48. Further, the construction of the frusto-conical condensate discharge passageway 22 or 22', wherein the passageway has an initial large diameter and flares continuously outward to the discharge end of the device, permits condensate to be expelled from the device in a fine spray 50 at high velocity, to reduce the collection of dirt and other debris in the coupling member 46 and the condensation return line 48.

Various other modifications, adaptations and alternative designs than those disclosed herein are, of course, possible in light of the above teachings. Therefore, it should be understood at this time that within the scope of the appended claims, the invention may be practiced otherwise than as specifically described herein.

What is claimed is:

1. A continuous flow steam condensate removal device comprising:
   an elongated tubular unitary one-piece body having an entrance end, an intermediate portion and an exit end;
   a cylindrical Venturi-type nozzle of relatively small diameter in the intermediate portion of said unitary one-piece body and extending along the longitudinal axis thereof;
   an elongated cylindrical upstream condensate collection passageway of larger diameter than said Venturi-type nozzle in said unitary one-piece body, said upstream condensate collection passageway extending from adjacent the entrance end of said unitary one-piece body and along the longitudinal axis of said unitary one-piece body to adjacent said Venturi-type nozzle;
   a downstream cylindrical discharge-transition passageway of larger diameter than said Venturi-type nozzle in said unitary one-piece body and extending along the longitudinal axis of the unitary one-piece body from adjacent said Venturi-type nozzle;
   a conically-shaped downstream condensate discharge passageway in said unitary one-piece body extending along the longitudinal axis of said unitary one-piece body, and flaring continuously outward in a downstream direction from adjacent an exit end of said downstream cylindrical discharge-transition passageway to substantially the exit end of said unitary one-piece body; and
   a conically-shaped internal portion in said unitary one-piece body and interconnecting the exit end of said downstream cylindrical discharge-transition passageway and said conically-shaped condensate discharge passageway, said conically-shaped interconnecting portion and said conically-shaped condensate discharge passageway flaring outward at different respective angles to the longitudinal axis of said unitary one-piece body.

2. The steam condensate removal device as recited in claim 1, wherein:
   said cylindrical upstream condensate collection passageway has a length on the order of twice that of said conically-shaped downstream condensate discharge passageway.

3. The steam condensate removal device as recited in claim 2, wherein:
   said conically-shaped downstream condensate discharge passageway has an initial upstream diameter larger than the diameter of said upstream condensate collection passageway.

4. The steam condensate removal device as recited in condensate discharge passageway; and
   said downstream cylindrical conically-shaped downstream condensate discharge passageway has an initial upstream diameter more than double that of the diameter of said condensate discharge-transition passageway.

5. The steam condensate removal device as recited in claim 1, further comprising:
   an annular conically tapered surface at the entrance end of said unitary one-piece body and surrounding an entrance to said elongated cylindrical upstream condensate collection passageway, said tapered surface extending inwardly in a downstream direction to facilitate smooth flow into said condensate collection passageway.

6. The steam condensate removal device as recited in claim 1, further comprising:
   an upstream cylindrical flow-reduction passageway in said unitary one-piece body and extending along the longitudinal axis of said unitary one-piece body between the upstream condensate collection passageway and the Venturi-type nozzle; and
   said flow-reduction passageway and said downstream cylindrical condensate discharge-transition passageway being of an intermediate diameter as compared to the diameters of said condensate collection passageway and said Venturi-type nozzle.

7. The steam condensate removal device as recited in claim 6, further comprising:
   internal conically tapered surfaces in said unitary one-piece body interconnecting adjacent ones of said passageways and said Venturi-type nozzle.

8. The steam condensate removal device as recited in claim 6, wherein:
   said cylindrical upstream condensate collection passageway has a length on the order of twice that of said conically-shaped downstream condensate discharge passageway.

9. The steam condensate removal device as recited in claim 8, wherein:
   said conically-shaped downstream condensate discharge passageway has an initial upstream diameter more than double that of the diameter of said condensate discharge-transition passageway.

10. The steam condensate removal device as recited in claim 7, wherein:

said elongated unitary one-piece body is formed of No. 316 stainless steel, and said body has external screw threads formed at opposite ends thereof and has at least two opposite side flat surfaces formed intermediate said external screw threads.

11. A continuous flow steam condensate removal device, comprising:

an elongated unitary one-piece body formed of No. 316 stainless steel, said body having external screw threads formed at opposite ends thereof, and said body having at least two opposite side flat surfaces formed intermediate said external screw-threads;

an elongated cylindrical upstream condensate collection passageway in said unitary one-piece body extending along a longitudinal axis of said unitary one-piece body;

an annular conically tapered surface surrounding an entrance to said elongated cylindrical upstream condensate collection passageway and extending inwardly in a downstream direction to facilitate flow into said condensate collection passageway;

a frustoconical downstream condensate discharge passageway in said unitary one-piece body flaring outward continuously in a downstream direction and extending along the longitudinal axis of said unitary body, said cylindrical upstream condensate collection passageway having a length on the order of at least twice that of said frustoconical downstream condensate discharge passageway, and said frustoconical downstream condensate discharge passageway having an initial upstream diameter larger than the diameter of said upstream condensate collection passageway;

a cylindrical Venturi-type nozzle in said unitary one-piece body and extending along the longitudinal axis of said unitary one-piece body, said Venturi-type nozzle being located between said upstream condensate collection passageway and said frustoconical downstream condensate discharge passageway and being of small diameter as compared to the diameters of said passageways;

upstream and downstream flow-reduction and discharge-transition passageways in said unitary one-piece body and extending along the longitudinal axis of said unitary one-piece body between said cylindrical upstream condensate collection passageway and said Venturi-type nozzle, and between said Venturi-type nozzle and said frustoconical downstream condensate discharge passageway, respectively, said flow-reduction and discharge-transition passageways being of essentially the same diameter, said latter diameter being of a value intermediate the diameters of said upstream condensate collection passageway and said Venturi-type nozzle, and said frustoconical downstream condensate discharge passageway having a diameter on the order of at least double that of said condensate discharge transition passageway;

a conically-shaped internal portion interconnecting the exit end of said downstream cylindrical condensate discharge-transition passageway and said frustoconical condensate discharge passageway, said condensate discharge passageway flaring outward at a reduced angle to the longitudinal axis of said unitary one-piece body as compared to an outward flaring angle of said conically-shaped interconnecting portion; and additional internal conically tapered surfaces in said unitary one-piece body interconnecting respective adjacent ones of said passageways and said Venturi-type nozzle.

12. The steam condensate removal device as recited in claim 1, wherein:

said downstream conically-shaped condensate discharge passageway flares outward at a reduced angle with respect to said conically-shaped interconnecting portion.

* * * * *